US012700622B2

(12) United States Patent
Lim

(10) Patent No.: US 12,700,622 B2
(45) Date of Patent: Aug. 4, 2026

(54) CELL MONITORING APPARATUS AND BATTERY PACK INCLUDING THE APPARATUS

(71) Applicant: SAMSUNG SDI CO., LTD., Yongin-si (KR)

(72) Inventor: Hantaek Lim, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 496 days.

(21) Appl. No.: 18/321,671

(22) Filed: May 22, 2023

(65) Prior Publication Data

US 2024/0313279 A1 Sep. 19, 2024

(30) Foreign Application Priority Data

Mar. 17, 2023 (KR) ........................ 10-2023-0035397

(51) Int. Cl.
H01M 10/48 (2006.01)
G08B 21/18 (2006.01)
(Continued)

(52) U.S. Cl.
CPC ............ H01M 10/48 (2013.01); G08B 21/18 (2013.01); H01M 10/425 (2013.01); H01M 50/30 (2021.01); H01M 10/44 (2013.01); H01M 50/209 (2021.01); H01M 50/284 (2021.01); H01M 50/3425 (2021.01); H01M 50/581 (2021.01); Y02E 60/10 (2013.01)

(58) Field of Classification Search
CPC .... H01M 10/48; H01M 10/425; H01M 50/30; H01M 10/44; H01M 50/209; H01M 50/581; H01M 50/284; H01M 50/3425; H01M 10/482; H01M 50/103; G08B 21/18; Y02E 60/10
See application file for complete search history.

(56) References Cited

U.S. PATENT DOCUMENTS

| | | |
|---|---|---|
| 2016/0111757 A1 | 4/2016 | Kim et al. |
| 2022/0013839 A1 | 1/2022 | Zeng et al. |
| 2022/0077507 A1 | 3/2022 | Hilligoss et al. |

FOREIGN PATENT DOCUMENTS

| | | |
|---|---|---|
| KR | 10-2019-0032883 | 3/2019 |
| KR | 10-1985761 B1 | 6/2019 |
| KR | 10-2022-0102642 A | 7/2022 |

OTHER PUBLICATIONS

European Search Report dated Dec. 20, 2023, issued in corresponding European Patent Application No. 23181584.6 (10 pages).

*Primary Examiner* — Christian T Bryant
(74) *Attorney, Agent, or Firm* — Womble Bond Dickinson (US) LLP

(57) ABSTRACT

A cell monitoring apparatus including a plurality of vent hole opening detectors and a controller, and a battery pack including the apparatus are provided. A cell monitoring apparatus includes: a plurality of vent hole opening detectors to be located in correspondence with each of a plurality of cells, each of the vent hole opening detectors including a plurality of holes corresponding to a position of a vent hole of a corresponding cell of the plurality of cells, each of the vent hole opening detectors configured to detect whether the vent hole of each of the plurality of cells is open using the plurality of holes; and a controller configured to detect a cell in which an event has occurred based on whether the vent hole of each of the plurality of cells is open.

10 Claims, 6 Drawing Sheets

(51) Int. Cl.
*H01M 10/42*           (2006.01)
*H01M 10/44*           (2006.01)
*H01M 50/209*        (2021.01)
*H01M 50/284*        (2021.01)
*H01M 50/30*          (2021.01)
*H01M 50/342*        (2021.01)
*H01M 50/581*        (2021.01)

CELL MONITORING APPARATUS AND BATTERY PACK INCLUDING THE APPARATUS

CROSS-REFERENCE TO RELATED APPLICATION

This application claims priority to and the benefit of Korean Patent Application No. 10-2023-0035397, filed on Mar. 17, 2023 in the Korean Intellectual Property Office, the entire content of which is incorporated herein by reference.

BACKGROUND

1. Field

Aspects of embodiments of the present disclosure relate to a cell monitoring apparatus and a battery pack including the apparatus.

2. Description of the Related Art

In general, for diagnosing thermal runaway of a battery system, a method of monitoring temperature in a battery module and voltages of battery cells or a method using a pressure sensor is mainly used.

However, in such a thermal runaway diagnosis method, it may be difficult to clearly identify which battery cell started thermal runaway or how thermal propagation progressed.

SUMMARY

According to aspects of one or more embodiments, a cell monitoring apparatus capable of detecting a battery cell in which thermal runaway has occurred and a battery pack including the apparatus are provided.

According to an aspect of one or more embodiments, a cell monitoring apparatus is provided. The cell monitoring apparatus includes: a plurality of vent hole opening detectors to be located in correspondence with each of a plurality of cells, each of the vent hole opening detectors comprising a plurality of holes corresponding to a position of a vent hole of a corresponding cell of the plurality of cells, each of the vent hole opening detectors configured to detect whether the vent hole of each of the plurality of cells is open using the plurality of holes; and a controller configured to detect a cell in which an event has occurred based on whether the vent hole of each of the plurality of cells is open.

Each of the plurality of vent hole opening detectors may include a first resistor and a second resistor connected in series between a power terminal supplying a power voltage and a ground, and a contact point connected to the controller, and the first resistor or the second resistor may be located in an area where the plurality of holes is located, or a first metal wiring pattern for connection with the first resistor or a second metal wiring pattern for connection with the second resistor may be located in the area where the plurality of holes is located.

The controller may be configured to determine the opening of the vent hole from the voltage of the contact point, and to determine a cell in which the event has occurred from the opening of the vent hole.

The holes may be located at intervals along a circumference of the vent hole.

The event may include thermal runaway.

According to another aspect of one or more embodiments, a battery pack is provided. The battery pack includes: a plurality of cells each including a plurality of vent holes; and a cell monitoring apparatus to detect whether the vent hole of each of the cells is open using a plurality of holes corresponding to a location of the vent hole of each of the cells, and to detect a cell of the plurality of cells in which an event has occurred based on whether each of the plurality of cells is open.

The holes corresponding to the location of the vent hole of each of the cells may be located at intervals along a circumference of the vent hole.

The cell monitoring apparatus may include a plurality of vent hole opening detectors to detect whether the vent hole of each of the plurality of cells is open using the plurality of holes, each of the plurality of vent hole opening detectors may include a first resistor and a second resistor connected in series between a power terminal supplying a power voltage and a ground, and the first resistor or the second resistor may be located in an area where the plurality of holes is located, or a first metal wiring pattern for connection with the first resistor or a second metal wiring pattern for connection with the second resistor may be located in the area where the plurality of holes is located.

The cell monitoring apparatus may further include a controller to determine whether the vent hole is open based on a voltage of a contact point between the first resistor and the second resistor.

A resistor of the first resistor or the second resistor located in the area where the plurality of holes is located or a resistor of the first resistor or the second resistor connected to a metal wiring pattern of the first metal wiring pattern or the second metal wiring pattern located in the area where the plurality of holes is located may be opened if an event of a corresponding cell occurs.

Figure 1:
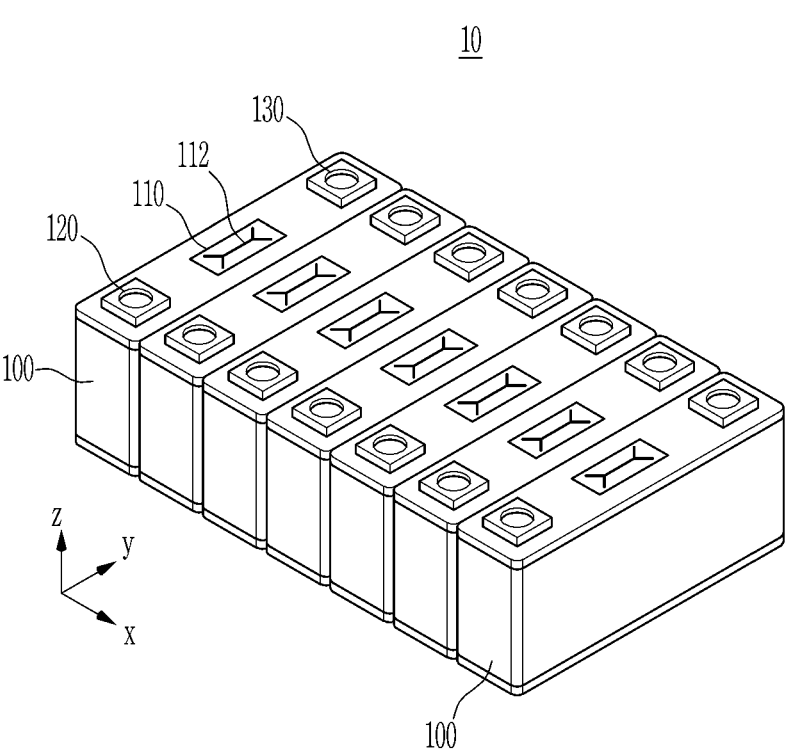
FIG. 1 is a perspective view of a battery pack according to an embodiment.

| DESCRIPTION OF SYMBOLS | |
|---|---|
| 10: battery pack | 100: cell |
| 110: vent hole | 112: notch |
| 120, 130: electrode terminal | 200: cell monitoring apparatus |
| 210: vent hole open detector | 220: controller |
| 230: PCB | 212: hole group |
| 2121: hole | |

DETAILED DESCRIPTION

Herein, some embodiments of the disclosure will be described in further detail with reference to the attached drawings so that a person of ordinary skill in the art may easily implement the disclosure. As those skilled in the art would realize, the described embodiments may be modified in various different ways, all without departing from the spirit or scope of the disclosure. The drawings and description are to be regarded as illustrative in nature and not restrictive. Like reference numerals designate like elements throughout the specification. In the flowchart described with reference to the drawings in this specification, the order of operations may be changed, several operations may be merged, some operations may be divided, and/or specific operations may not be performed.

Throughout the specification and claims, if a part is referred to "comprise" or "include" a certain element, it means that it may further comprise or include other elements rather than exclude other elements, unless specifically indicated otherwise.

In addition, expressions described in the singular may be interpreted in the singular or plural unless explicit expressions such as "one" or "single" are used.

In addition, terms including an ordinal number, such as "first," "second," etc., may be used to describe various elements, but the elements are not limited by the terms. The above terms are used for the purpose of distinguishing one element from another element. For example, without departing from the scope of the present disclosure, a first element may be referred to as a second element, and similarly, a second element may be referred to as a first element.

Further, if a component is referred to be "connected" with another component, it includes not only a case in which two components are directly connected but also a case in which two components are indirectly or non-contactedly connected with one or more other components interposed therebetween, or a case in which two components are electrically connected. On the other hand, if an element is referred to as "directly connected" to another element, it is to be understood that no other element exists therebetween.

Unless otherwise defined, all terms (including technical and scientific terms) used herein have the same meaning as commonly understood by one of ordinary skill in the art to which the inventive concept pertains. It is also to be understood that terms defined in commonly used dictionaries should be interpreted as having meanings consistent with the meanings in the context of the related art, and are expressly defined herein unless they are interpreted in an ideal or overly formal sense.

FIG. 1 is a perspective view of a battery pack according to an embodiment.

Referring to FIG. 1, a battery pack 10 may include a plurality of cells 100 which may be inserted in an inner space of a pack case.

The plurality of cells 100 may be connected in series or parallel to each other.

Each of the cells 100 may accommodate an electrode assembly and an electrolyte inside a cell case constituting a body, and may include a vent hole 110 and electrode terminals 120 and 130 on an outer surface of the cell case.

The vent hole 110 is generally in a closed state. If an event such as thermal runaway of the cell 100 occurs and gas or flame is generated inside the cell 100, the vent hole is opened to output gas or flame to the outside of the cell 100. For example, the vent hole 110 may be provided such that a notch 112 is formed at a specific portion such that the specific portion is broken if an internal pressure of the cell 100 increases.

In an embodiment, the cell 100 may be configured as a prismatic cell. In this case, the vent hole 110 may be configured at the top of the cell 100 in an upright state.

However, the cell 100 may be configured as a cell of another shape (e.g., a cylindrical cell), and the shape of the cell 100 is not limited thereto.

The cells 100 inserted in a pack case may be arranged such that the vent holes 110 of the cells 100 are arranged side by side while facing a same direction (e.g., a z-axis direction).

Figure 2:
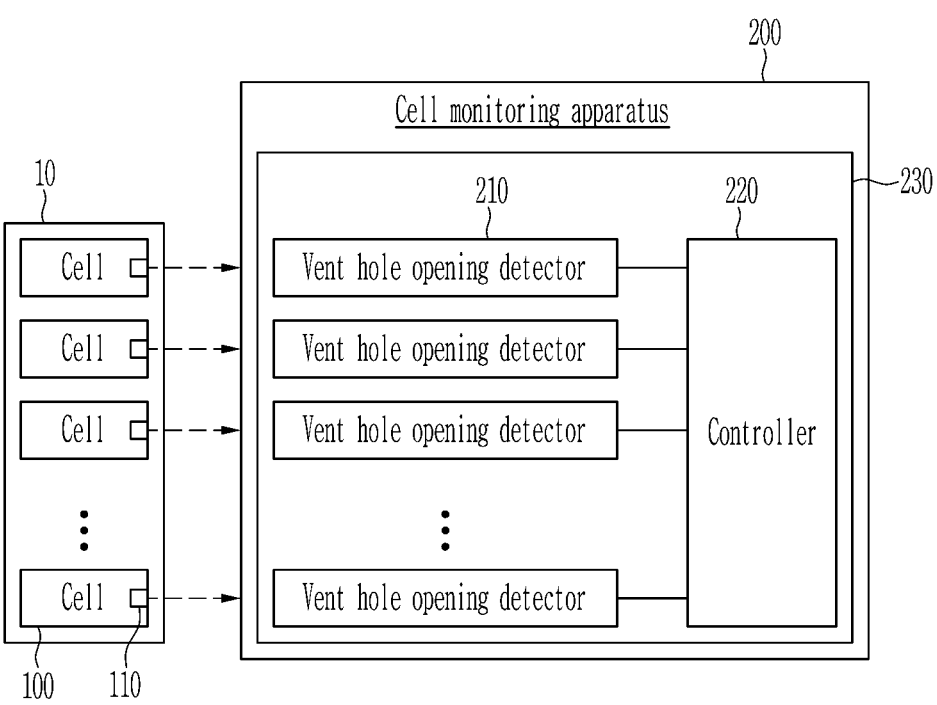
FIG. 2 is a diagram illustrating a cell monitoring apparatus according to an embodiment.
Figure 3:
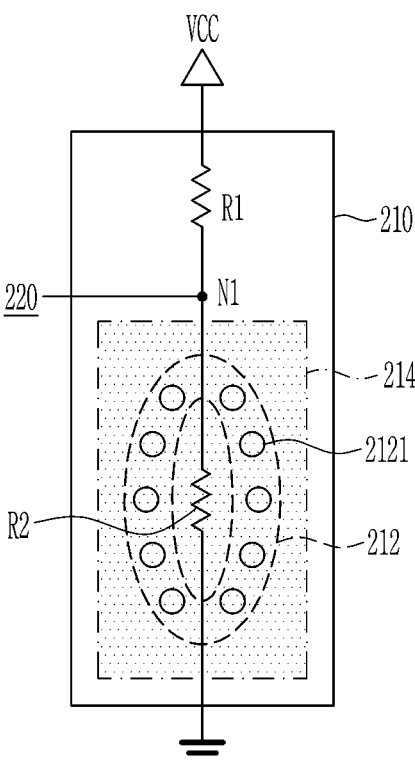
FIG. 3 is a diagram illustrating a vent hole opening detector shown in FIG. 2.

FIG. 2 is a diagram illustrating a cell monitoring apparatus according to an embodiment; and FIG. 3 is a diagram illustrating a vent hole opening detector shown in FIG. 2.

Referring to FIG. 2, the cell monitoring apparatus 200 may include a plurality of vent hole opening detectors 210 and a controller 220. In an embodiment, the plurality of vent hole opening detectors 210 and the controller 220 may be mounted on a printed circuit board (PCB) 230.

The plurality of vent hole opening detectors 210 respectively correspond to the plurality of cells 100 constituting the battery pack 10, and may detect whether the vent holes 110 formed in the corresponding cells 100 are open.

Referring to FIG. 3, each of the plurality of vent hole opening detectors 210 may include a hole group 212 and resistors R1 and R2. In FIG. 3, only one of the vent hole opening detectors 210 is shown for convenience.

The hole group 212 may be disposed in an area 214 corresponding to the vent hole 110 formed in a corresponding cell 100.

The hole group 212 may include a plurality of holes 2121 spaced apart from each other at intervals (e.g., predetermined intervals) along a circumference of the vent hole 110 formed in the corresponding cell 100 on the PCB 230. The holes 2121 may be non-through holes. The purpose of the non-through holes is that, if they are placed in the PCB, in the event of thermal runaway, the entire PCB will not be destroyed, and only a part of the non-through holes may be destroyed.

The resistors R1 and R2 may constitute a resistive voltage divider circuit. An end of a first resistor R1 may be connected to a power terminal supplying a power voltage VCC, another end of the first resistor R1 may be connected to an end of a second resistor R2, and another end of the second resistor R2 may be connected to ground. In an embodiment, the second resistor R2 may be disposed in the area 214 where the hole group 212 is located. A node N1 corresponding to a contact point between the resistors R1 and R2 may be connected to the controller 220. The power supply voltage VCC is divided by the resistors R1 and R2, and the voltage of the node N1 divided by the resistors R1 and R2 may be transmitted to the controller 220.

Again referring to FIG. 2, the controller 220 may detect a cell 100 in which an event such as thermal runaway has occurred from the voltages of the nodes N1 transmitted from the plurality of vent hole opening detectors 210.

The controller 220 may include a plurality of input terminals, and the voltages of the nodes N1 transmitted from the plurality of vent hole opening detectors 210 may be input through different input terminals of the controller 220. Accordingly, the controller 220 may detect a cell 100 in which an event has occurred from the voltages of the nodes N1 transmitted from the plurality of vent hole opening detectors 210. However, the voltages of the nodes N1 transmitted from several event hole opening detectors 210 may be input to one input terminal of the controller 220. In this case, the voltages of the nodes N1 transmitted from the event hole opening detectors 210 detecting whether the vent holes 110 of adjacent cells 100 are open may be input to one input terminal of the controller 220.

In an embodiment, the controller 220 may be an analog front end (AFE) integrated circuit (IC). The controller 220 may be a microcontroller or a radio frequency (RF) IC.

If an event such as thermal runaway occurs, the vent hole 110 of the cell 100 is opened by the pressure of gas generated inside the cell 100. Accordingly, a space between the holes 2121 formed corresponding to the corresponding cell 100 may be opened, and the area 214 where the hole group 212 is located may be damaged. Then, the resistor R2 disposed in the area 214 where the hole group 212 is located is opened. The opening of the resistor R2 may mean that the circuit is disconnected.

The voltage at the node N1 may vary depending on whether the resistor R2 is open or shorted. Accordingly, the controller 220 may detect a cell 100 in which an event such as thermal runaway has occurred based on the voltage of the node N1.

For example, if resistance values of the resistors R1 and R2 are 10 Kohm and the power supply voltage is 5 V, the voltage at the node N1 becomes 2.5 V due to the resistive voltage division, and the voltage of 2.5 V may be transmitted to the controller 220. At this time, a thermal runaway occurred in one of the cells, the hole group 212 formed corresponding to the cell 100 in which the thermal runaway occurred was destroyed, and the resistor R2 disposed in the area 214 where the hole group 212 was located is open. Then, the voltage of the node N1 becomes 5 V by the resistive voltage division, and the voltage of 5 V can be transmitted to the controller 220. The controller 220 may check the voltage of 5 V and detect a cell in which an event such as thermal runaway has occurred.

If a cell in which an event has occurred is detected, the controller 220 may stop charging or discharging of the battery pack 10.

In an embodiment, the cell monitoring apparatus 200 may be implemented as a battery management system (BMS) that monitors the state of the battery pack 10.

The cell monitoring apparatus 200 may include at least one processor. At least one processor may be implemented in any of various types such as an application processor (AP), a central processing unit (CPU), a graphics processing unit (GPU), and the like. The at least one processor may store program commands for implementing at least some functions of the plurality of vent hole opening detectors 210 and the controller 220 in a memory and execute the program commands stored in the memory to perform a cell monitoring operation.

Figure 4:
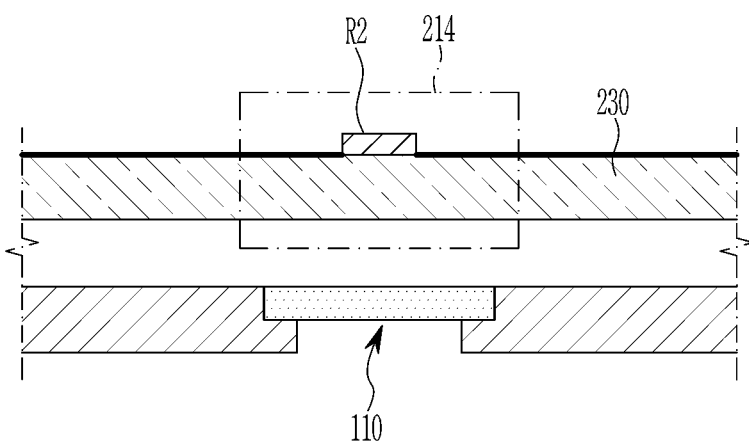
FIG. 4 is a diagram showing a position of a resistor shown in FIG. 3, according to an embodiment.

FIG. 4 is a diagram showing a position of a resistor shown in FIG. 3, according to an embodiment.

Referring to FIG. 4, the second resistor R2 may be disposed in the area 214 where the hole group 212 is located.

As described above, the hole group 212 may be positioned to correspond to the vent hole 110 formed in the corresponding cell 100.

Since the second resistor R2 is disposed in the area 214 where the hole group 212 is located, if thermal runaway occurs in any one cell 100, the second resistor R2 disposed in the area 214 where the hole group 212 corresponding to the cell 100 where the thermal runaway has occurred is located may be opened.

Figure 5:
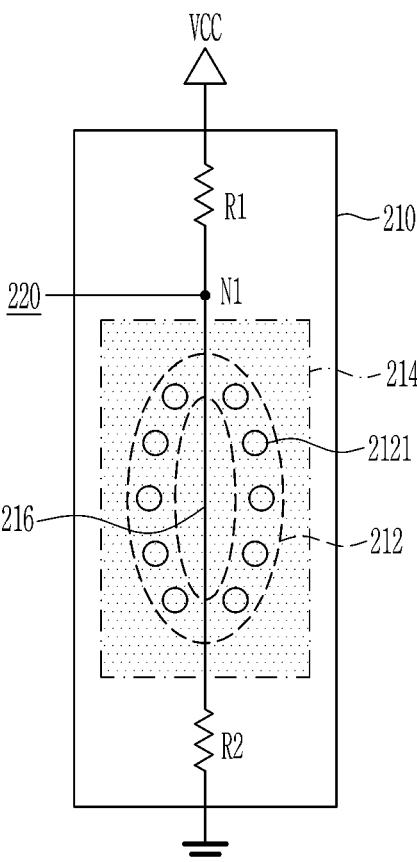
FIG. 5 is a view showing an example of a position of a resistor in the vent hole opening detector shown in FIG. 2, according to an embodiment.

FIG. 5 is a view showing an example of a position of a resistor in the vent hole opening detector shown in FIG. 2, according to an embodiment.

Referring to FIG. 5, the second resistor R2 may be located outside the area 214 where the hole group 212 is located. The node N1 and the second resistor R2 may be connected by a metal wiring pattern 216, and the metal wiring pattern 216 may be formed to pass through the area 214 where the hole group 212 is located.

In this way, if thermal runaway occurs in one cell 100, in the area 214 where the hole group 212 corresponding to the cell 100 in which the thermal runaway has occurred is located may be damaged and the metal wiring pattern 216 may be cut off. Accordingly, the resistor R2 may be opened.

As such, the cell monitoring apparatus 200, as shown in FIGS. 3 to 5, has the plurality of holes 2121 and the second resistor R2 and/or the metal wiring pattern 216 for connection with the resistor R2 in the region 214 corresponding to the vent hole 110, and it is possible to accurately identify a cell 100 in which an event such as thermal runaway has occurred.

Figure 6:
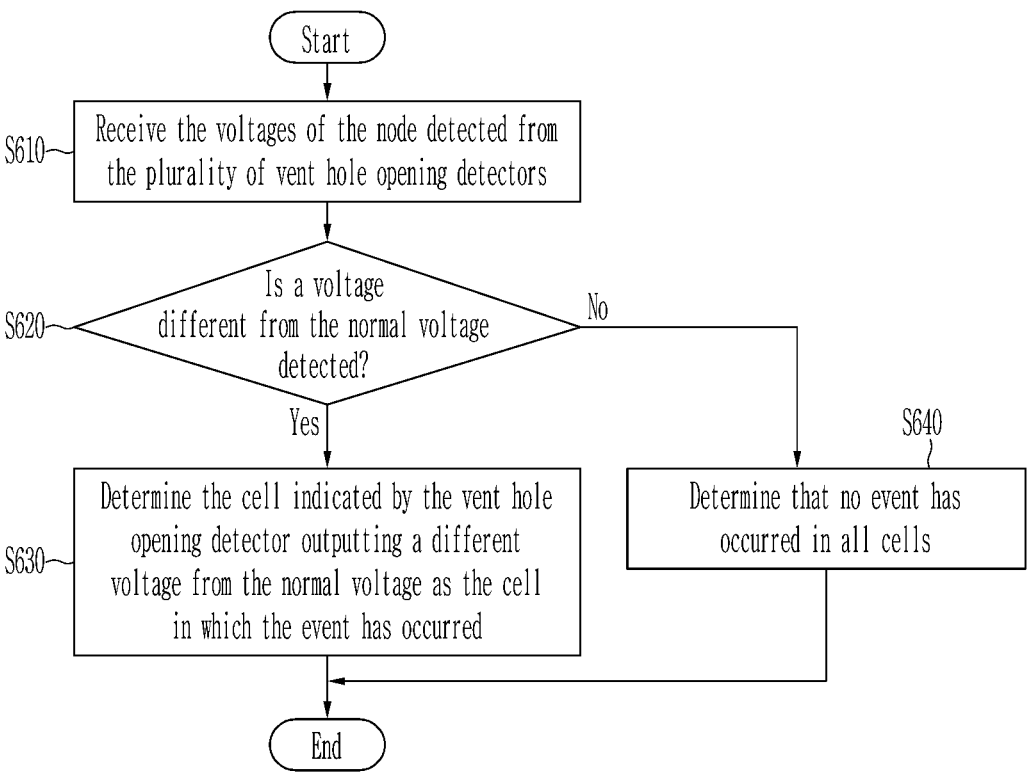
FIG. 6 is a flowchart illustrating a cell monitoring method of a cell monitoring apparatus according to an embodiment.

FIG. 6 is a flowchart illustrating a cell monitoring method of a cell monitoring apparatus according to an embodiment.

Referring to FIG. 6, the controller 220 of the cell monitoring apparatus 200 receives the voltages of the nodes N1 detected from the plurality of vent hole opening detectors 210 (S610).

The controller 220 of the cell monitoring apparatus 200 checks whether a voltage different from a normal voltage is detected among the voltages of the nodes N1 detected by the plurality of vent hole opening detectors 210. The normal voltage may refer to the voltage detected in the normal state of the cell 100 as the voltage of the node N1, and the normal voltage may refer to 2.5 V in the case of the above-described example. The voltage different from a normal voltage is the voltage of the node N1 detected if an event such as thermal runaway occurs, and may refer to 5 V in the case of the example described above.

If a voltage different from the normal voltage is detected (S620), the controller 220 of the cell monitoring apparatus 200 determines the cell 100 indicated by the vent hole opening detector 210 outputting a different voltage from the normal voltage as the cell 100 in which the event has occurred (S630).

Meanwhile, if a voltage different from the normal voltage is not detected (S620), the controller 220 of the cell monitoring apparatus 200 may determine that no event has occurred in all cells (S640).

According to at least one embodiment, it is possible to detect a cell in which thermal runaway has occurred, and, based on this, a faulty sensor and an actual thermal runaway situation can be distinguished, an accurate situation can be notified to passengers, and a diagnosis mode can be accurately implemented.

Although some embodiments have been described above, the scope of the present disclosure is not limited thereto, and it will be understood that various modifications and improvements made by those skilled in the art using the basic concept of the present disclosure set forth in the following claims are also included within the scope of the present disclosure.

What is claimed is:
1. A cell monitoring apparatus comprising:
a plurality of vent hole opening detectors to be located in correspondence with each of a plurality of cells, each of the vent hole opening detectors comprising a plurality of holes corresponding to a position of a vent hole of a corresponding cell of the plurality of cells, each of the vent hole opening detectors configured to detect whether the vent hole of each of the plurality of cells is open using the plurality of holes; and a controller configured to detect a cell in which an event has occurred based on whether the vent hole of each of the plurality of cells is open, wherein each of the plurality of vent hole opening detectors comprises a first resistor and a second resistor that are connected in series between a power terminal supplying a power voltage and a ground, and the second resistor is directly connected to the ground.

2. The cell monitoring apparatus as claimed in claim 1, wherein each of the plurality of vent hole opening detectors comprises a contact point connected to the controller, and the first resistor or the second resistor is located in an area where the plurality of holes is located, or a first metal wiring pattern for connection with the first resistor or a second metal wiring pattern for connection with the second resistor is located in the area where the plurality of holes is located.

3. The cell monitoring apparatus as claimed in claim 2, wherein the controller is configured to determine the opening of the vent hole from the voltage of the contact point, and to determine a cell in which the event has occurred from the opening of the vent hole.

4. The cell monitoring apparatus as claimed in claim 1, wherein the holes are located at intervals along a circumference of the vent hole.

5. The cell monitoring apparatus as claimed in claim 1, wherein the event includes thermal runaway.

6. A battery pack comprising:

a plurality of cells each comprising a vent hole; and a cell monitoring apparatus to detect whether the vent hole of each of the cells is open using a plurality of holes corresponding to a location of the vent hole of each of the cells, and to detect a cell of the plurality of cells in which an event has occurred based on whether each of the plurality of cells is open, wherein the cell monitoring apparatus comprises a plurality of vent hole opening detectors to detect whether the vent hole of each of the plurality of cells is open using the plurality of holes, wherein each of the plurality of vent hole opening detectors comprises a first resistor and a second resistor connected in series between a power terminal supplying a power voltage and a ground, and the second resistor is directly connected to the ground.

7. The battery pack as claimed in claim 6, wherein the holes corresponding to the location of the vent hole of each of the cells are located at intervals along a circumference of the vent hole.

8. The battery pack as claimed in claim 6, wherein the first resistor or the second resistor is located in an area where the plurality of holes is located, or a first metal wiring pattern for connection with the first resistor or a second metal wiring pattern for connection with the second resistor is located in an area where the plurality of holes is located.

9. The battery pack as claimed in claim 8, wherein the cell monitoring apparatus further comprises a controller to determine whether the vent hole is open based on a voltage of a contact point between the first resistor and the second resistor.

10. The battery pack as claimed in claim 8, wherein a resistor of the first resistor or the second resistor located in the area where the plurality of holes is located or a resistor of the first resistor or the second resistor connected to a metal wiring pattern of the first metal wiring pattern or the second metal wiring pattern located in the area where the plurality of holes is located is opened if an event of a corresponding cell occurs.

* * * * *